United States Patent
Crooks et al.

(10) Patent No.: US 10,942,687 B2
(45) Date of Patent: Mar. 9, 2021

(54) PRINT QUALITY MONITORING AND CORRECTION

(71) Applicant: NCR Corporation, Atlanta, GA (US)

(72) Inventors: John Crooks, Duluth, GA (US); Michael Lee Barlow, Duluth, GA (US); Andrew Klenzak, Atlanta, GA (US); Brian Patrick Rogers, Roswell, GA (US); Sergio Silva, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/455,820

(22) Filed: Jun. 28, 2019

(65) Prior Publication Data

US 2020/0409612 A1  Dec. 31, 2020

(51) Int. Cl.

| | |
|---|---|
| *G06F 3/12* | (2006.01) |
| *G06Q 20/20* | (2012.01) |
| *G06T 7/00* | (2017.01) |
| *H04N 1/00* | (2006.01) |

(52) U.S. Cl.
CPC ............ *G06F 3/121* (2013.01); *G06F 3/1208* (2013.01); *G06F 3/1234* (2013.01); *G06F 3/1243* (2013.01); *G06F 3/1256* (2013.01); *G06Q 20/209* (2013.01); *G06T 7/0008* (2013.01); *H04N 1/0009* (2013.01); *H04N 1/00015* (2013.01); *H04N 1/00031* (2013.01); *H04N 1/00045* (2013.01); *H04N 1/00055* (2013.01); *H04N 1/00087* (2013.01); *H04N 1/00323* (2013.01); *H04N 1/00334* (2013.01); *H04N 1/00411* (2013.01); *G06T 2207/30144* (2013.01); *H04N 2201/0082* (2013.01); *H04N 2201/0084* (2013.01); *H04N 2201/0089* (2013.01)

(58) Field of Classification Search
None
See application file for complete search history.

(56) References Cited

U.S. PATENT DOCUMENTS

| | | | | |
|---|---|---|---|---|
| 6,031,621 | A  * | 2/2000 | Binder | G03G 15/5079 235/383 |
| 6,538,770 | B1 * | 3/2003 | Mestha | H04N 1/00002 358/1.9 |
| 7,428,074 | B2 * | 9/2008 | Kitahara | H04N 1/56 358/1.14 |
| 8,622,299 | B2 * | 1/2014 | Crooks | G06K 7/1404 235/454 |
| 9,519,816 | B2 * | 12/2016 | Crooks | G06K 7/10584 |
| 9,809,035 | B2 * | 11/2017 | Ochs | G01J 5/041 |

(Continued)

*Primary Examiner* — Scott A Rogers
(74) *Attorney, Agent, or Firm* — Schwegman, Lundberg & Woessner

(57) ABSTRACT

Various embodiments herein each include at least one of systems, software, and methods for detecting such problems and to take corrective action. One embodiment, in the form of a method, includes instructing a printer to print a document including a testing output and receiving an image of the document including the testing output from an imaging device. This method further includes analyzing the testing output included in the received image in view of an expected testing output to identify a printing issue and then storing a result of the analysis. The method may also include performing at least one remedial action to correct an identified printing issue.

10 Claims, 5 Drawing Sheets

(56) References Cited

U.S. PATENT DOCUMENTS 10,291,825 B2 * 5/2019 Ohba ................. G03G 15/5062
2009/0021784 A1 * 1/2009 Hoshii ............... H04N 1/00363
358/1.15

* cited by examiner

PRINT QUALITY MONITORING AND CORRECTION

BACKGROUND INFORMATION

Print heads of printers, such as retail thermal printers, inkjet printers, and other printers, fail over time, eventually rendering printed documents, such as receipts, illegible or at least below a quality standard acceptable to the retailer. Barcodes printed on receipts are especially vulnerable and become difficult to scan/decode as the print head fails. Expired or low-quality thermal print papers are also a cause for poor quality Point-Of-Sale (POS) receipts. Additionally, mis-configured printers and POS terminals following service or initial installation give rise to problems for field engineers.

SUMMARY

Various embodiments herein each include at least one of systems, software, and methods for detecting such problems and to take corrective action. One embodiment, in the form of a method, includes instructing a printer to print a document including a testing output and receiving an image of the document including the testing output from an imaging device. This method further includes analyzing the testing output included in the received image in view of an expected testing output to identify a printing issue and then storing a result of the analyzing. The method may also include performing at least one remedial action to correct an identified printing issue.

Another method embodiment includes instructing a printer of a POS terminal to print a document including a testing output and outputting an instruction from a display of the POS terminal to present the printed document to an imaging device for capturing an image of a document including the testing output as generated in response to the instructing of the printer. This method may then proceed with receiving, by a processor of a process executing on a processor of a computer controlling operation of the POS terminal, a captured image of the document including the testing output from the imaging device. The method further includes analyzing, by the processor, the testing output included in the received image in view of an expected testing output to identify a printing issue. A result of the analyzing may then be stored and the method may then perform, on the POS terminal, at least one remedial action to correct an identified printing issue.

A further embodiment that takes the form of a system that includes a printer, a display, an imaging device, a computer processor, and a memory device storing instructions that are executable by the computer processor to perform data processing activities. In some embodiments, the data processing activities include instructing the printer to print a document including a testing output and outputting an instruction from the display to present the printed document to the imaging device for capturing an image of a document including the testing output as generated in response to the instructing of the printer. The data processing activities also include receiving a captured image of the document including the testing output from the imaging device and analyzing the testing output included in the received image in view of an expected testing output to identify a printing issue. The data processing activities may also include storing a result of the analyzing on the memory device and performing at least one remedial action to correct an identified printing issue.

DETAILED DESCRIPT ION

Figure 1:
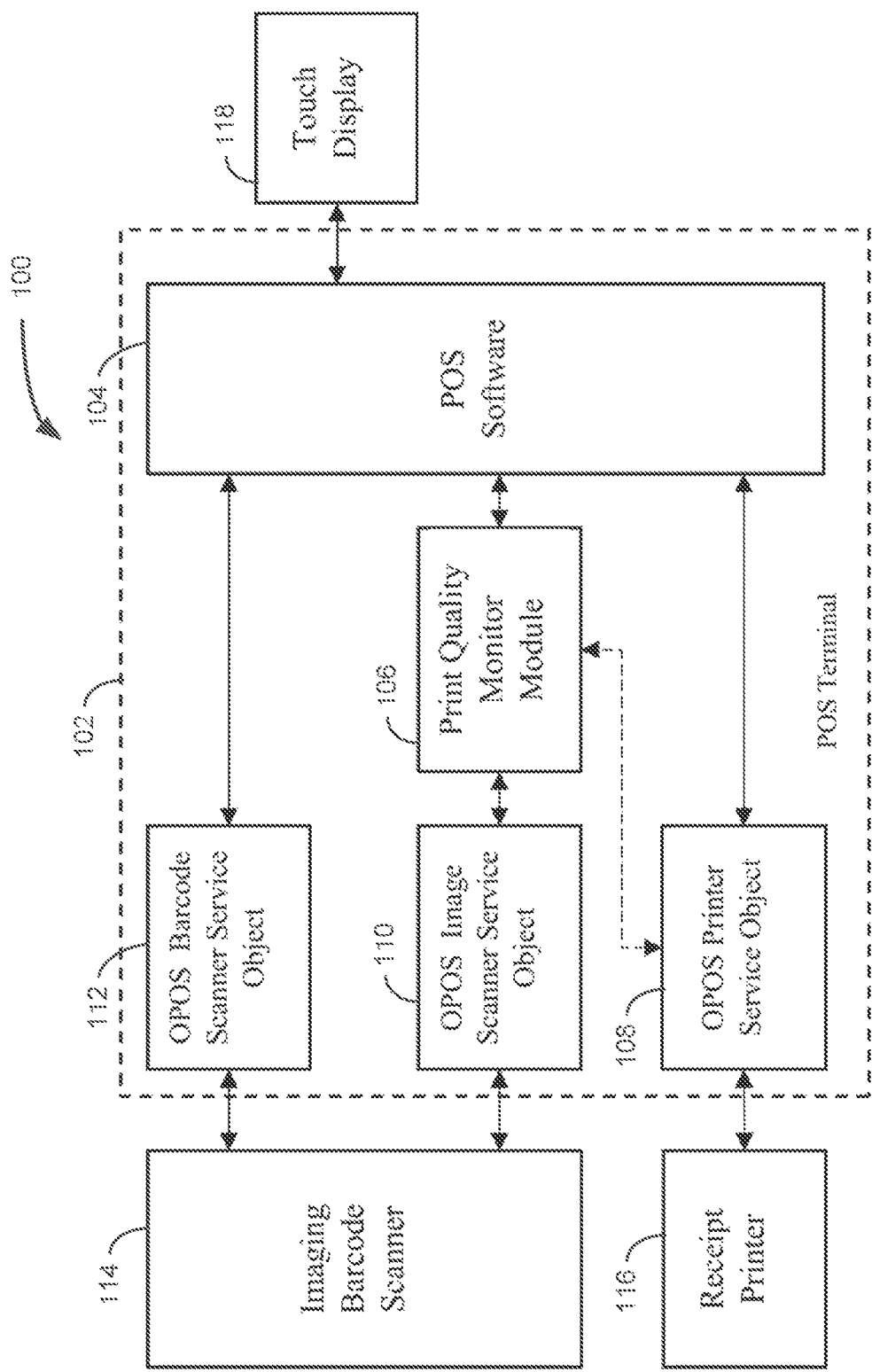
FIG. 1 is a logical block diagram of a system, according to an example embodiment.

As mentioned above, print heads of printers, such as retail thermal printers, inkjet printers, and other printers, fail over time, eventually rendering printed documents, such as receipts, illegible or at least below a quality standard acceptable to the retailer. Barcodes printed on receipts are especially vulnerable and become difficult to scan/decode as the print head fails. Expired or low-quality thermal print papers are also a cause for poor quality Point-Of-Sale receipts. Additionally, mis-configured printers and POS terminals following service or initial installation give rise to problems for field engineers.

Various embodiments herein each include at least one of systems, software, and methods for detecting such problems and to take corrective action, such as by automated system configuration changes, outputting instructions to users or designated personnel for making suggested changes such as to paper, device connections, and even device replacements. Such embodiments enable quicker identification and resolution of print issues without requiring higher level support and automated or instructed scheduling of such higher-level support when still necessary.

Some embodiments are directed to solutions that operate to periodically check thermal receipt printer quality in a POS system using an imaging barcode scanner. There are many different imaging barcode scanners on the market such as the 78/79 bioptic scanner's available from NCR Corporation of Atlanta, Ga. The system, such as the system 100 of FIG. 1, periodically prints a test pattern, such as the pattern 204 of FIG. 2, on a test receipt, e.g., example document 200, and prompts the operator to place the receipt with test pattern on the barcode scanner horizontal window. The system then captures and analyzes an image of the test pattern. If there is a print quality problem, the system, in some embodiments, initiates corrective action. Corrective action might include adjusting print head temperature, trying a different paper roll, cleaning the print head, or calling for NCR field service.

Some of these and other embodiments may include a method for detecting and correcting printer configuration. In case of printer communication problems, for example because the printer is configured for RS232 communications when the system is expecting USB communications, the system may prompt the operator to print a configuration receipt containing the printer configuration encoded in a 2D or other barcode. The system may then prompt the operator to scan the configuration barcode on the barcode scanner. If the system, after processing the data read from the barcode, identifies a problem in the printer configuration, the system may instruct the operator to properly re-configure the printer, send a configuration signal to the printer, configure the system to be compatible with the printer, or other action.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 2:
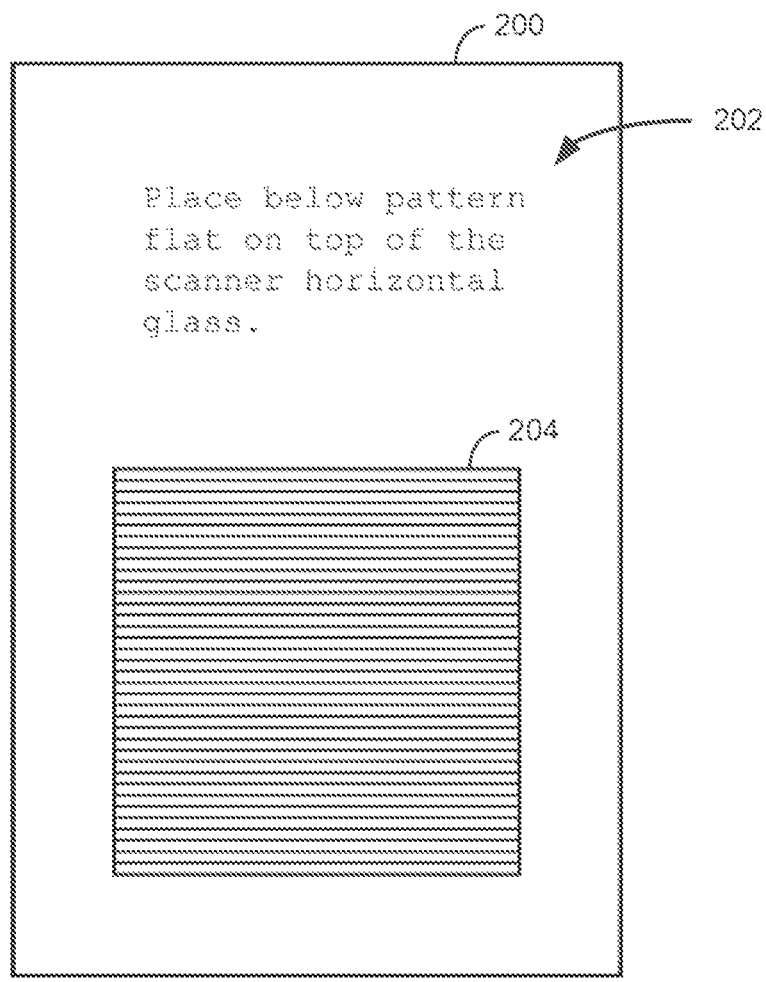
FIG. 2 illustrates an example document printed according to an example embodiment.

FIG. 1 is a logical block diagram of a system 100, according to an example embodiment. The system 100 is an example of a system on which various method embodiments may be implemented. Some of the components illustrated are compliant with the POS device standard for MICROSOFT® WINDOWS® operating systems known as Object Link Embedding (OLE) for Retail POS. This standard is commonly referred to as OPOS, such as included in FIG. 1. However, some embodiments may be implemented outside of the retail context and therefore, OPOS compliance is not a requirement for all embodiments.

The system 100 includes a POS terminal 102 with POS software 104 that executes thereon to control operation of the POS terminal 102. The POS terminal 102 may include a touch display 118 to output visual information and to receive touch input, one or more scanners such as imaging barcode scanner 114, and a document printer such as receipt printer 116. The POS terminal 102 may also include a print quality monitor module 106 that communicates with the POS software 104 and interfaces with an OPOS image scanner service object 110 to receive images of scanned receipts from the imaging barcode scanner 114. The POS software 104 may also communicate with the imaging barcode scanner 114 via an OPOS barcode scanner service object 112.

Communication with the receipt printer is performed via an OPOS printer service object 108. The print quality monitor module 106 may also communicate with the OPOS Printer service object 108 to instruct the receipt printer 116 to print a receipt for scanning, such as the example document 200 illustrated in FIG. 2.

The example system 100 may be a conventional POS system with a POS terminal 102, a thermal receipt printer 116, a touch display 118, and an imaging barcode scanner 114. The imaging barcode scanner 114 may have cameras inside for reading barcodes and capturing still images. The POS software 104, for example NCR R10 Emerald available from NCR Corporation of Atlanta, Ga., communicates with the barcode scanner through the OPOS barcode scanner service object 108, and with the thermal receipt printer 116 through the OPOS printer service object 112. The print quality monitor module 106 may capture imaging barcode scanner 114 images through the OPOS image scanner service object 110, analyze the images, and communicates the results to the POS software 104.

To monitor print quality, the system 100 generally operates by periodically printing a test receipt containing a test pattern, such as at system 100 logon in the morning or during logoff at closing which may be a condition to complete the logon/logoff operation, after a certain number of prints, when a new roll of paper is added, following maintenance or other service, and the like. The test pattern may be the testing output 204 as illustrated in the example document 200 of FIG. 2, a barcode encoded with a data representation of a configuration of the receipt printer 116, another image, or other data. Regardless of when the test printing is performed or what is printed, the system 100 may prompt the operator to place the test receipt on top of the imaging barcode scanner 114 horizontal window with the printed side down. The prompting may be through instructions printed on the printed document, such as the instructions 202 printed on the example document 200 of FIG. 2 or as output from the touch display 118 or other visual output device. The system 100 then captures an image of the test pattern and analyzes the print quality. If the system detects print quality problems, the system 100 initiates corrective action, such as by instructing the user to take a corrective action, performing a configuration change automatically in the system 100 or other device such as the receipt printer 116, automatically scheduling or requesting service from field service technicians, and the like.

In embodiments of the system 100 where the receipt printer 116 is a double-sided thermal printer, the system 100 may print test testing output on both sides of the paper and prompt the user to scan both sides of the paper. The front and back testing output, in some embodiments, are slightly different so the system 100 can verify both test testing outputs have been scanned, for example the series of horizontal lines of the testing output 204 of FIG. 2 may have a different spacing for the front and back patterns or be rotated 90 degrees such that the lines are vertical. Alternatively, when the testing output is a barcode, the barcode may be encoded with data identifying the side of the printing.

In some embodiments, the system 100 in the print quality monitoring module 106 analyzes print quality using image processing algorithms that are readily available, for example the type used in barcode quality analyzers such as the Axicon 15000 available from Axicon Auto ID Limited of Oxfordshire, United Kingdom. In some embodiments, the print quality monitoring module 106, when analyzing the image, may look for missing or uneven lines which indicate a failing print head. The print quality monitoring module 106 may also look for overall poor black/white contrast which indicates a failing/improperly adjusted print head, or poor quality/expired thermal paper. If the test pattern is a 2D barcode, the print quality monitoring module 106 analyzes print quality using barcode quality metrics known in the an, for example the ISO 2859 and ISO 3951 international standards. Some 2D barcode decoding packages already in use include a measure of barcode quality whenever they read a barcode and can be repurposed in such embodiments.

In some embodiments, the system 100 initiates corrective action by directly contacting a field engineer, by sending quality data to a services server of an entity contracted to monitor system 100 operation, or by prompting the operator to call for field service. To help the operator call for field service, the system 100 might display a website, phone number, or email-type or present such information encoded within a QR code that may be scanned by a mobile device to initiate the desired action to reach a help desk.

Figure 3:
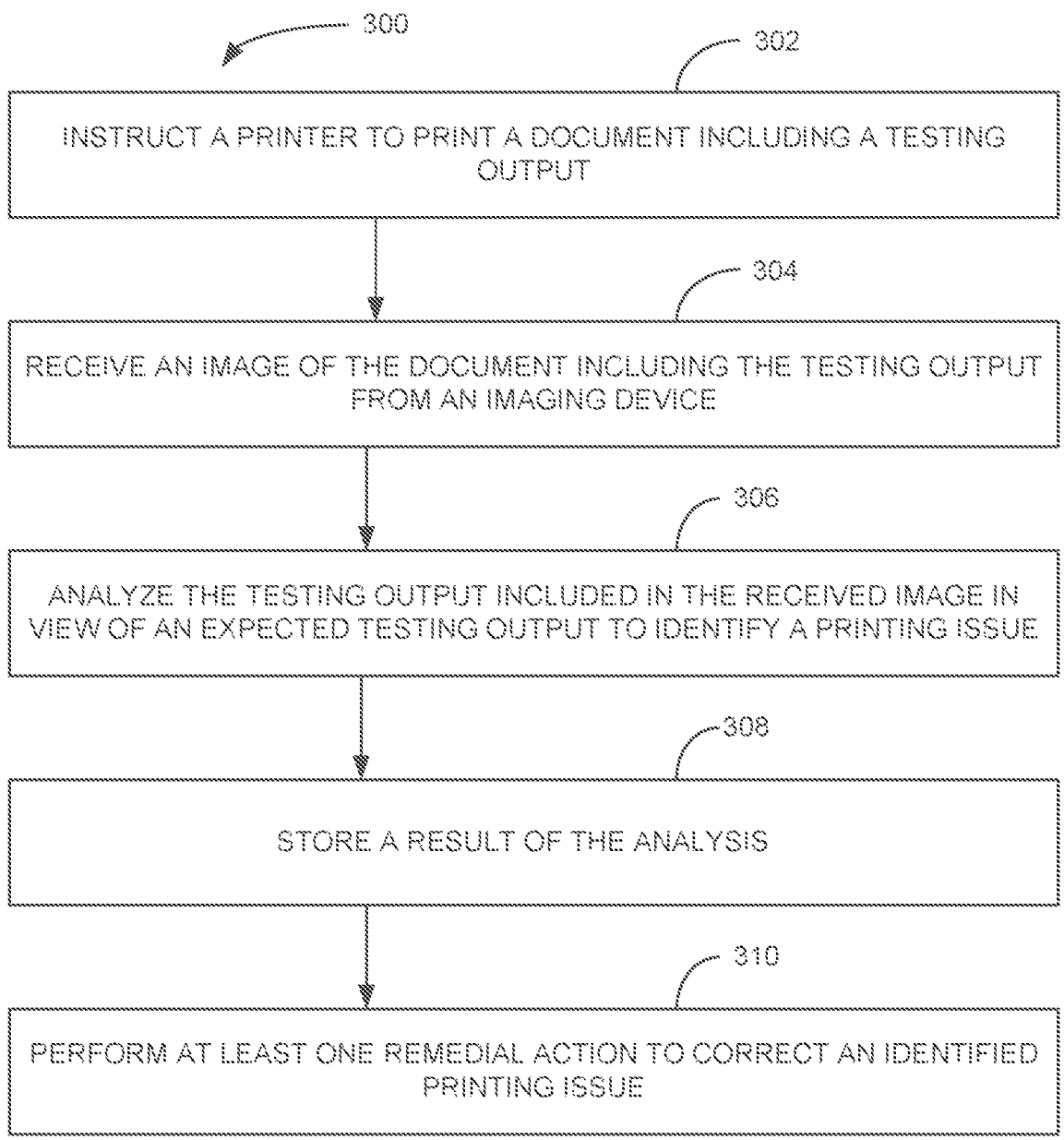
FIG. 3 is a logical block diagram of a method, according to an example embodiment.

FIG. 3 is a logical block diagram of a method 300, according to an example embodiment. The method 300 is an example of a method that may be performed, in whole or in pan, by the print quality monitor module 106 of FIG. 1.

The method 300 includes instructing 302 a printer to print a document including a testing output and receiving 304 an image of the document including the testing output from an imaging device. The method 300 also includes analyzing 306 the testing output included in the received image in view of an expected testing output to identify a printing issue. A result of the analysis 306 is typically stored 308 either locally or across a network to a server that stores such information for purposes of monitoring operation of subject computing devices. The method 300 further includes performing 310 at least one remedial action to correct an identified printing issue.

In some embodiments of the method 300, the printer is a receipt printer. Further, the identified printing issue may include an issue with regard to paper on which the document was printed and the at least one remedial action to be performed 310 includes outputting a human-perceptible instruction to correct the paper issue. In some such embodiments, outputting the human-perceptible instruction includes providing an instruction via a display device of a terminal on which the method is performed. In other such embodiments, the instruction may be output on a printed document output from the printer.

In some of these and other method 300 embodiments, analyzing 306 the testing output includes consideration of properties of the received image including print contrast, print density, and detecting presence and absence of unexpected and expected artifacts. In some such embodiments, performing 310 at least one remedial action to correct an identified printing issue includes modifying a configuration setting of the printer to modify one or both of print contrast and print density.

Figure 4:
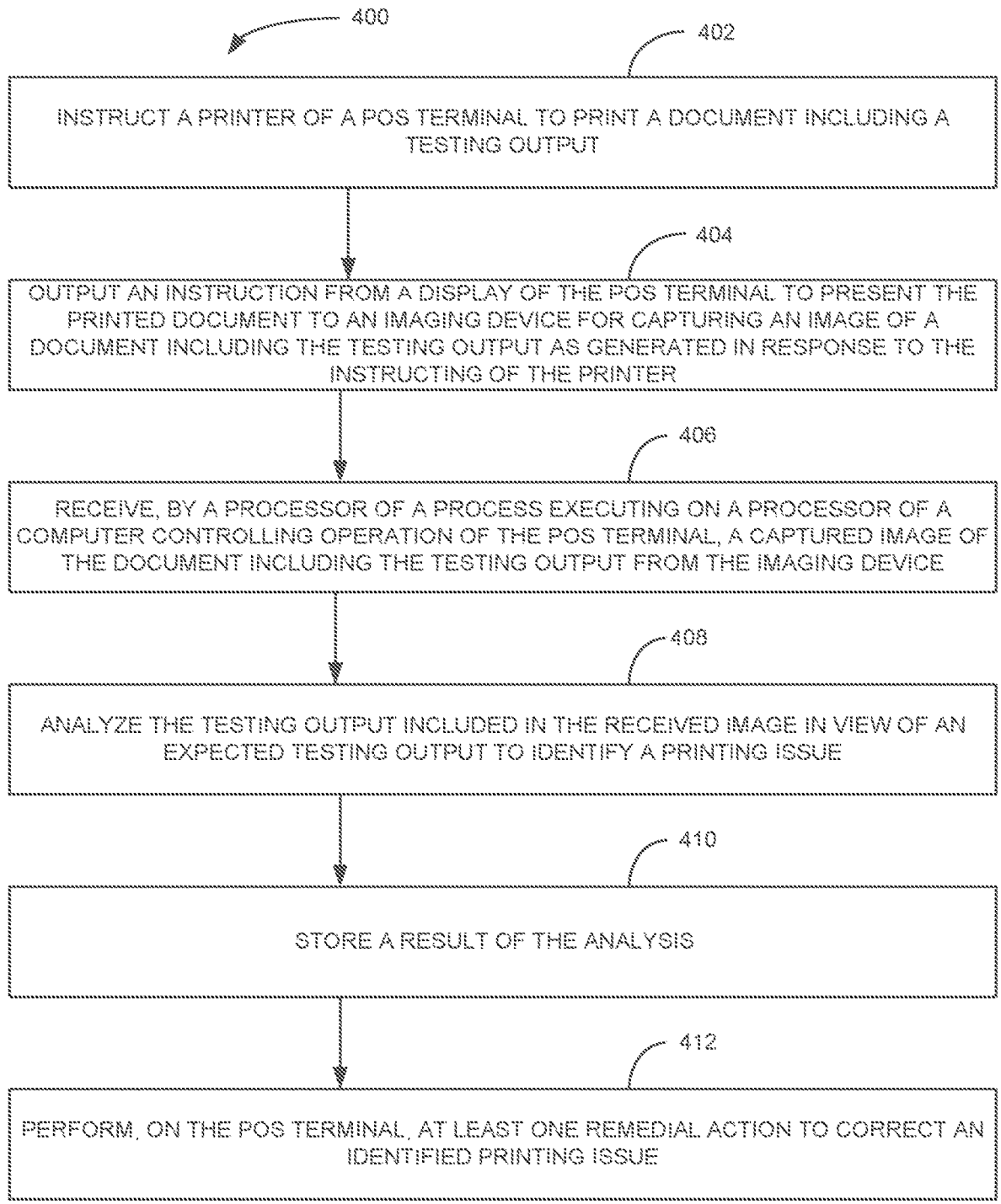
FIG. 4 is a logical block diagram of a method, according to an example embodiment.

FIG. 4 is a logical block diagram of a method 400, according to an example embodiment. The method 400 is another example of a method that may be performed, in whole or in part, by the print quality monitor module 106 of FIG. 1.

The method 400 includes instructing 402 a printer of a POS terminal to print a document including a testing output and outputting 404 an instruction from a display of the POS terminal to present the printed document to an imaging device for capturing an image of a document including the testing output as generated in response to the instructing of the printer. The method 400 also includes receiving 406, by a processor of a process executing on a processor of a computer controlling operation of the POS terminal, a captured image of the document including the testing output from the imaging device. The method 400 then analyzes 408 the testing output included in the received image in view of an expected testing output to identify a printing issue storing a result of the analysis. The method 400 further includes performing 410, on the POS terminal, at least one remedial action to correct an identified printing issue.

In some embodiments, the analyzing 408 of the testing output includes consideration of properties of the received image including print contrast, print density, and detecting presence and absence of unexpected and expected artifacts. In these and some other embodiments of the method 400, the analysis 408 includes comparing data decoded from a barcode included in the testing output with expected data. In another embodiment, the testing output includes an image and the analysis 408 includes image comparison. Regardless, performing 410 the at least one remedial action to correct an identified printing issue includes modifying a configuration setting of the printer to modify one or both of print contrast and print density.

Figure 5:
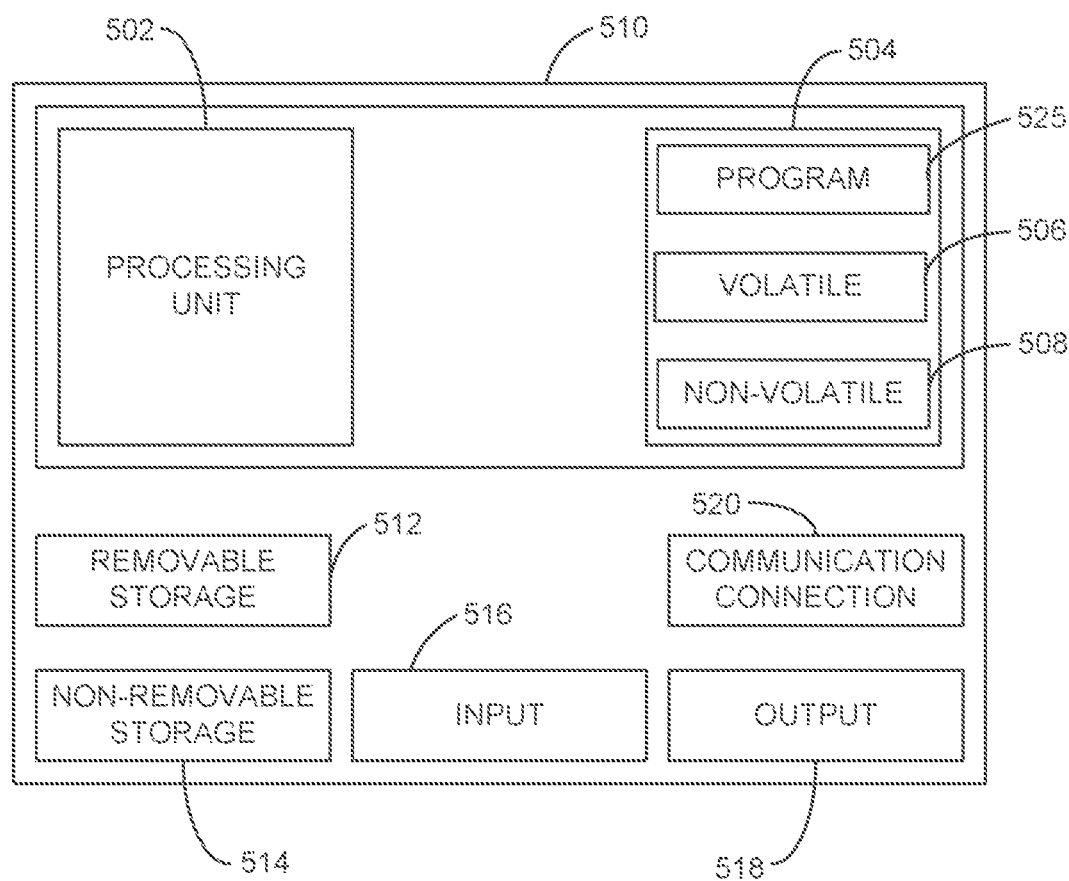
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing devices. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   instructing a printer of a point-of-sale (POS) terminal to print a document including a testing output;
   outputting an instruction from a display of the POS terminal to present the printed document to an imaging device for capturing an image of a document including the testing output as generated in response to the instructing of the printer;
   receiving, from a product scanner of the POS terminal by a processor of a process executing on a processor of a computer controlling operation of the POS terminal, a captured image of the document including the testing output from the imaging device;
   analyzing, by the processor, the testing output included in the received image in view of an expected testing output to identify a printing issue;
   storing a result of the analysis; and
   performing, on the POS terminal, at least one remedial action to correct an identified printing issue.

2. The method of claim 1, wherein the printer is a receipt printer.

3. The method of claim 2, wherein:
   the identified printing issue includes an issue with regard to paper on which the document was printed; and
   the at least one remedial action includes outputting instruction from the display device to correct the paper issue.

4. The method of claim 1, wherein:
   analyzing the testing output includes consideration of properties of the received image including print contrast, print density, and detecting presence and absence of unexpected and expected artifacts; and
   performing at least one remedial action to correct an identified printing issue includes modifying a configuration setting of the printer to modify one or both of print contrast and print density.

5. The method of claim 1, wherein the instructing of the printer to print the document including the test output is performed on a scheduled periodic basis.

6. A system comprising:
   a printer;
   a display;
   an imaging device;
   a computer processor; and
   a memory device storing instructions that are executable by the computer processor to perform data processing activities, the data processing activities comprising:
      instructing the printer to print a document including a testing output;
      outputting an instruction from the display to present the printed document to the imaging device for capturing an image of a document including the testing output as generated in response to the instructing of the printer;
      receiving, from a product scanner of a POS terminal, a captured image of the document including the testing output from the imaging device;
      analyzing the testing output included in the received image in view of an expected testing output to identify a printing issue;
      storing a result of the analysis on the memory device; and
      performing at least one remedial action to correct an identified printing issue.

7. The system of claim 6, wherein the testing output includes a barcode encoded with data including a representation of configuration settings of the printer.

8. The system of claim 7, wherein analyzing the testing output includes comparing the configuration settings represented in the barcode with expected configuration settings.

9. The system of claim 6, wherein:
   the printer is a receipt printer;
   the identified printing issue includes an issue with regard to paper on which the document was printed; and
   the at least one remedial action includes outputting instruction from the display to correct the paper issue.

10. The system of claim 6, wherein:
   analyzing the testing output includes consideration of properties of the received image including print contrast, print density, and detecting presence and absence of unexpected and expected artifacts; and
   performing at least one remedial action to correct an identified printing issue includes modifying a configuration setting of the printer to modify one or both of print contrast and print density.

* * * * *